United States Patent [19]

Baird

[11] Patent Number: 4,468,859

[45] Date of Patent: Sep. 4, 1984

[54] LIQUID DEPTH MEASURING DEVICE

[76] Inventor: Hal C. Baird, 813 E. Pennsylvania, Boise, Id. 83707

[21] Appl. No.: 482,023

[22] Filed: Apr. 4, 1983

[51] Int. Cl.³ ............................................. G01F 23/04
[52] U.S. Cl. ............................................. 33/126.4 R
[58] Field of Search ..................... 33/126.4; 73/864.63

[56] References Cited

U.S. PATENT DOCUMENTS

| | | | |
|---|---|---|---|
| 846,669 | 3/1907 | Howell | 33/126.4 R X |
| 980,320 | 1/1911 | Millea et al. | 33/126.4 R |
| 1,039,923 | 10/1912 | Ganey | 73/864.63 |
| 1,644,415 | 10/1927 | Cosgro | 73/864.63 |
| 2,701,919 | 2/1955 | Anderson | 33/126.4 R |

Primary Examiner—Harry N. Haroian
Attorney, Agent, or Firm—Laubscher, Philpitt & Laubscher

[57] ABSTRACT

A liquid depth measuring device for measuring the depth of a liquid in a tank or other receptacle is disclosed. The device includes a vertically arranged outer housing member having a tubular central body portion, a tapered valve seat at the lower end of the body portion, and an annular sliding bearing member at the upper end of the body portion. The device further includes a tubular inner housing member mounted for longitudinal sliding movement through the bearing and extending in concentrically spaced relation within the outer housing member to form an annular space therebetween. A tapered valve member adapted for sealing engagement with the valve seat is carried at the lower end of the inner housing member, and a graduated measuring tape is arranged longitudinally within the inner housing member.

2 Claims, 4 Drawing Figures

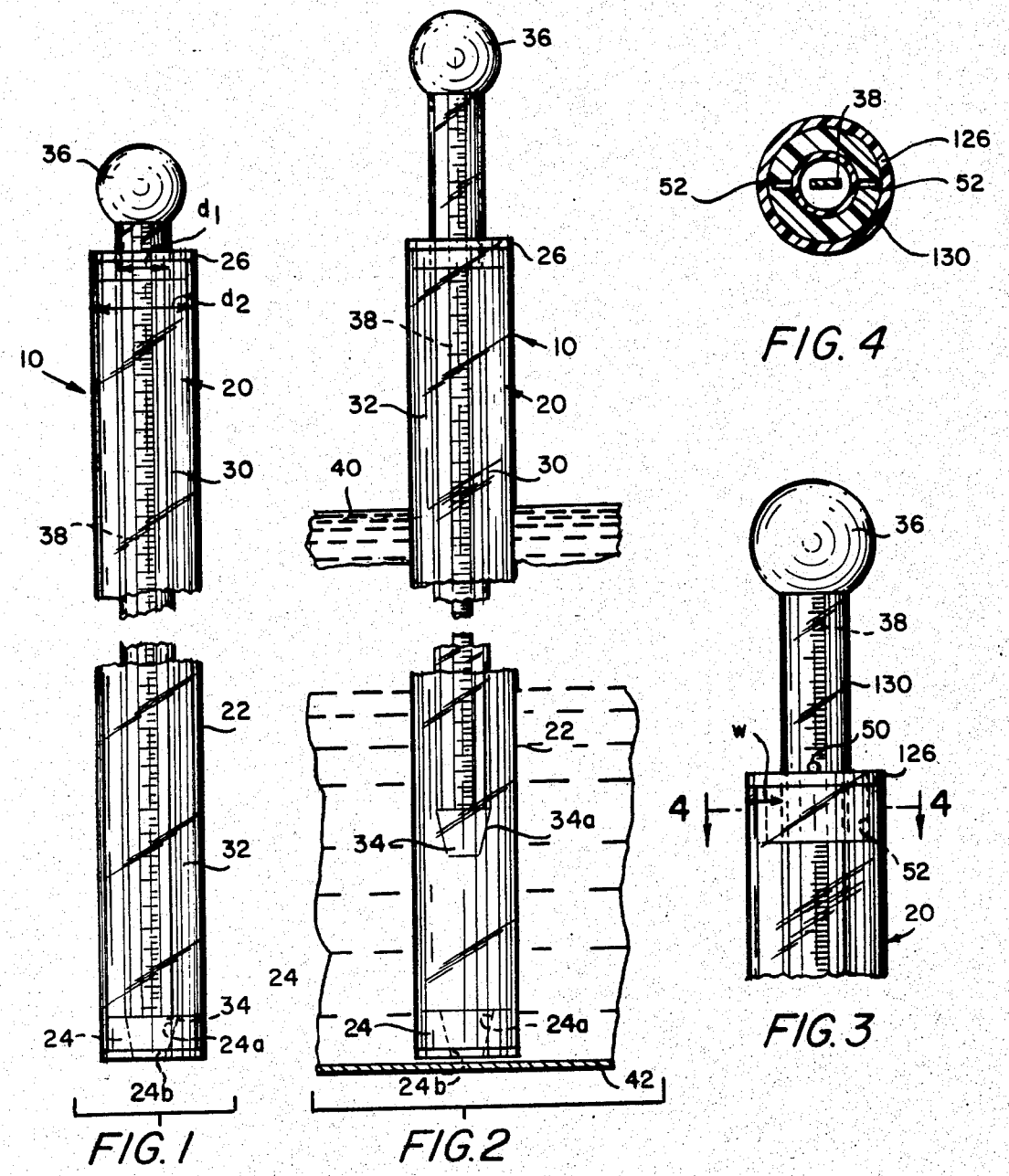

LIQUID DEPTH MEASURING DEVICE

BACKGROUND OF THE INVENTION

The present invention relates to a mesuring device for measuring the depth of a liquid in a tank.

BRIEF DESCRIPTION OF THE PRIOR ART

Various devices for measuring the depth of a liquid in a tank are well-known in the patented prior art as evidenced, for example, by the U.S. Pat. Nos. 980,320 to Millea et al, 1,853,813 to Horsting, 2,534,644 to Welch, and 3,390,463 to Hirsch. While the prior devices normally operate quite satisfactorily, they each possess certain inherent drawbacks which limit their accuracy and ease of operation for repeated use in corrosive and harmful liquids.

For example, the patents to Millea et al and Horsting disclose measuring devices including a tubular member having a gauge or measuring scale arranged therein. Liquid is admitted into the interior of the tube, whereby the measuring scale is in direct contact with the liquid. Thus, where the liquid is corrosive, the gauge or measuring markings gradually deteriorate necessitating frequent replacement thereof. The device disclosed by Welch includes two tubular members for measuring liquid depth wherein liquid is retained in the tubes by means of the operator pressing his finger over the open top of the tubes to form an air lock between the liquid and the operator's finger. The inaccuracy and awkwardness of such a device, in addition to the danger of contact of the operator's skin with harmful liquids, prevents convenient use of the device over an extended period of time. The patent to Hirsch discloses a liquid depth measuring device which is operated at its lower, liquid immersed end. Such a means for control prevents accurate measurement by an operator and causes the unintentional release of liquids retained therein. The present invention was developed in order to overcome the above and other disadvantages of the prior devices by providing an improved liquid depth measuring device.

SUMMARY OF THE INVENTION

Accordingly, the present invention relates to a device for measuring the depth of a liquid in a tank or other receptacle, characterized by increased measuring accuracy and ease of operation. The device may be used repeatedly, even in corrosive liquids, without destruction thereof, and may be used to retain a liquid therein for an extended period of time.

The measuring device of the present invention includes a vertically arranged outer housing member having a tubular central body portion, a tapered valve seat at the lower end of the body portion, and an annular sliding bearing member at the upper end of the body portion. The device further includes a tubular inner housing member mounted for longitudinal sliding movement through the sliding bearing member and extending in concentrically spaced relation within the outer housing member to form an annular space therebetween. A tapered valve adapted for sealing engagement with the valve seat is carried at the lower end of the inner housing member, and a graduated measuring tape is arranged longitudinally within the inner housing member. When the device is inserted into a liquid-containing receptacle in contact with the bottom thereof, and the inner housing member is lifted upwardly, the passage through the valve seat is opened to admit liquid into the annular space to a height equal to the depth of the liquid in the receptacle. The inner housing member is subsequently lowered to close the valve seat passage. The height of the liquid which is retained in the measuring device corresponds with the height of the liquid in the receptacle and may be easily read from the tape measure arranged within the inner housing member when the device is withdrawn from the receptacle.

BRIEF DESCRIPTION OF THE DRAWING

The present invention may be more fully understood in light of the drawings in which:

FIG. 1 is a front elevational view of a first embodiment of the liquid depth measuring device of the present invention;

FIG. 2 is a partial elevational view of the measuring device of the present invention;

FIG. 3 is an enlarged front elevational view of the upper portion of a second embodiment of the measuring device of the present invention; and FIG. 4 is an enlarged view of a cross-section taken along line 4—4 of FIG. 3.

DETAILED DESCRIPTION OF THE INVENTION

With particular reference to FIGS. 1 and 2, the liquid depth measuring device of the present invention is generally designated 10. The measuring device includes a vertically arranged outer housing member 20 and a tubular inner housing member 30, both of which are formed of transparent synthetic plastic material. A particularly preferred material is nylon owing to its resistance to clouding, shattering, and deterioration due to liquids such as gasoline.

The outer housing member 20 includes a tubular central body portion 22 and a downwardly tapered valve seat 24 arranged at the lower end of the central body portion. The valve seat includes a conical tapered surface 24a defining a fluid passageway 24b. The outer housing member further includes an annular sliding bearing member 26 at the upper end of the central body portion, the sliding bearing member having an inner diameter, $d_1$, which is less than the inner diameter, $d_2$, of the central body portion.

The tubular inner housing member 30 is mounted for longitudinal sliding movement through sliding bearing 26 and extends in concentrically spaced relation within the outer housing member 20. An annular space 32 is thereby formed between the inner and outer members, the purpose of which will be explained in greater detail below. The inner housing member may be vertically displaced between a lower position shown in FIG. 1 and an upper position shown in FIG. 2. It will also be noted, for reasons set forth below, that the length of the inner housing member is greater than that of the outer housing member.

The lower end of the inner housing member 30 is closed by a valve member 34. The valve member includes a downwardly convergent conically tapered surface 34a which corresponds with the tapered surface 24a of the valve seat 24. When the inner housing member is in its lower position, as shown in FIG. 1, the valve member 34 is seated on the valve seat 24, and the corresponding tapered surfaces, 34a and 24a respectively, close the fluid passageway 24b and create a fluid-tight seal therebetween.

The liquid depth measuring device is further provided with a handle 36 which is connected with the upper end of the inner housing member 30. With reference to FIG. 1, it is noted that owing to the greater longitudinal length of the inner housing member, the upper end of the inner housing member extends above the upper end of the outer housing member, whereby the handle 36 is at a higher elevation than the upper end of the outer housing member. The handle 36 may be of any desired configuration and is disclosed in the drawings as a sphere. The handle 36 may be used by the operator of the liquid depth measuring device to raise and lower the inner housing member between its lower and upper positions.

Arranged within the inner housing member 30 is a graduated measuring tape 38. The tape 38 is sealed within the inner housing member since the valve member 34 closes the lower end of the inner housing member and the handle 36 closes the upper end of the inner housing member. Therefore, the measuring tape is prevented from contacting any corrosive liquids in which the present device may be inserted for measurement.

In operation, the liquid depth measuring device is initially inserted into a liquid-containing tank 40 (FIG. 2), and its lower end is in contact with the bottom floor 42 of the tank. By means of the handle 36, the inner housing member 30 is lifted to an upper position whereby the valve member 34 is lifted from the valve seat 24, thereby opening the fluid passageway 24b. Liquid enters through the fluid passageway 24b into the annular space 32 defined between the inner and outer housing members. Owing to the surrounding liquid pressure in the tank, the liquid in the annular space rises to a height equal to that of the liquid in the tank.

Before removal of the measuring device from the tank, the inner housing member is lowered to its lower position to thereby seat the valve member 34 on the valve seat 24 to close the fluid passageway 24b and create a fluid-tight seal therebetween. Once the inner housing member is in its lower position and the passageway 24b is closed, the device is removed from the tank and the height of the liquid contained in the annular space 32 is easily determined from the measuring tape 38 owing to the transparency of the walls of the inner and outer housing members.

The advantages of operation of a device according to the present invention over the prior art are many. The operator's control over the opening and closing of the fluid passage is easy and convenient. The valve member is easily located on or removed from the valve seat, and the tapered configuration thereof provides a dependable, fail-safe fluid-tight seal. The measuring tape is prevented from contacting any liquids and therefore is not corroded or destroyed upon continued use of the device. Finally, liquid may be retained in the device for as long a period as is necessary.

FIGS. 3 and 4 disclose another embodiment of the present invention wherein the liquid depth measuring device is provided with a retaining mechanism for retaining the inner housing member in its upper position. The retaining mechanism includes at least one pin member 50 extending orthogonally from the inner housing member. For reasons set forth below, the pin member 50 extends from the inner housing member at a point which is lower than the elevation of the upper surface of the annular sliding bearing member 126 when the inner housing member is in its lower position. Furthermore, the pin member 50 extends from the inner housing member a distance which is less than the width, W, of the annular sliding bearing means 126.

As disclosed particularly in FIG. 4, the annular sliding bearing member 126 contains on its inner circumference at least one vertical through slot 52 corresponding with the pin member 50. The slot 52 is adapted to permit the passage of the pin member 50 therethrough when inner housing member 130 is raised to its upper position. Once the pin member has passed vertically upwardly through the slot means, the inner housing member is rotated about its vertical axis to a position in which the pin member rests on the upper surface of the annular sliding bearing member, thereby to retain the inner housing member in its upper position owing to the point of location of the pin member on the inner housing member.

While the preferred embodiments of the present invention have been disclosed, it will be understood that modifications and variations may be effected without departing from the spirit and scope of the novel concepts of this invention.

What is claimed is:
1. A liquid depth measuring device, comprising
(a) a vertically arranged outer housing member formed of a transparent synthetic plastic material, said outer housing member including
  (1) a tubular central body portion;
  (2) means defining a downwardly tapered valve seat at the lower end of said central body portion, said valve seat having a fluid passageway therethrough; and
  (3) means defining an annular sliding bearing at the upper end of said central body portion, said sliding bearing having an inner diameter which is less than that of said central body portion;
(b) a tubular inner housing member mounted for longitudinal sliding movement through said bearing and extending in concentrically spaced relation within said outer housing member, thereby to define an annular space between said inner and outer members, said annular space being in fluid communication with said fluid passageway, said inner housing member being vertically movable between lower and upper positions relative to said outer housing member, the length of said inner housing member being greater than that of said outer housing member;
(c) valve means carried by and closing the lower end of said inner housing member, said valve means having a downwardly convergent conical surface corresponding with that of said tapered valve seat for creating a fluid-tight seal when said inner member is in its lower position and said valve means is seated on said valve seat;
(d) a handle connected with the upper end of said inner housing member at a higher elevation than the upper end of said outer housing member;
(e) a graduated measuring tape arranged longitudinally within said inner housing member; and
(f) retaining means for retaining the inner housing member in its upper position, said retaining means including at least one pin member extending orthogonally from said inner housing member at a point which is lower than the elevation of the upper surface of said annular sliding bearing means when said inner housing member is in its lower position, said pin member extending a distance less than the width of said annular sliding bearing means, said annular sliding bearing means containing in its inner circumferential surface at least one vertical through slot corresponding with said pin member and being adapted to permit the passage of said pin member therethrough, whereby when said liquid depth measuring device is vertically inserted into a liquid receptacle in contact with the bottom thereof, and said inner member is lifted to its upper position with said pin member passing vertically upwardly through said slot, the passage through the valve seat is opened to supply liquid into said annular space to a height equal to that of the liquid in the receptacle, and when said inner housing member is rotated about its vertical axis, said pin member rests on the upper surface of said bearing means, and when said inner member is subsequently displaced to the lower position to close the valve seat passage, the height of the liquid contained in the annular space corresponds with the height of the liquid in the receptacle.

2. A liquid depth measuring device as defined in claim 1, wherein said transparent plastic material comprises nylon.

* * * * *